Patented Aug. 7, 1945

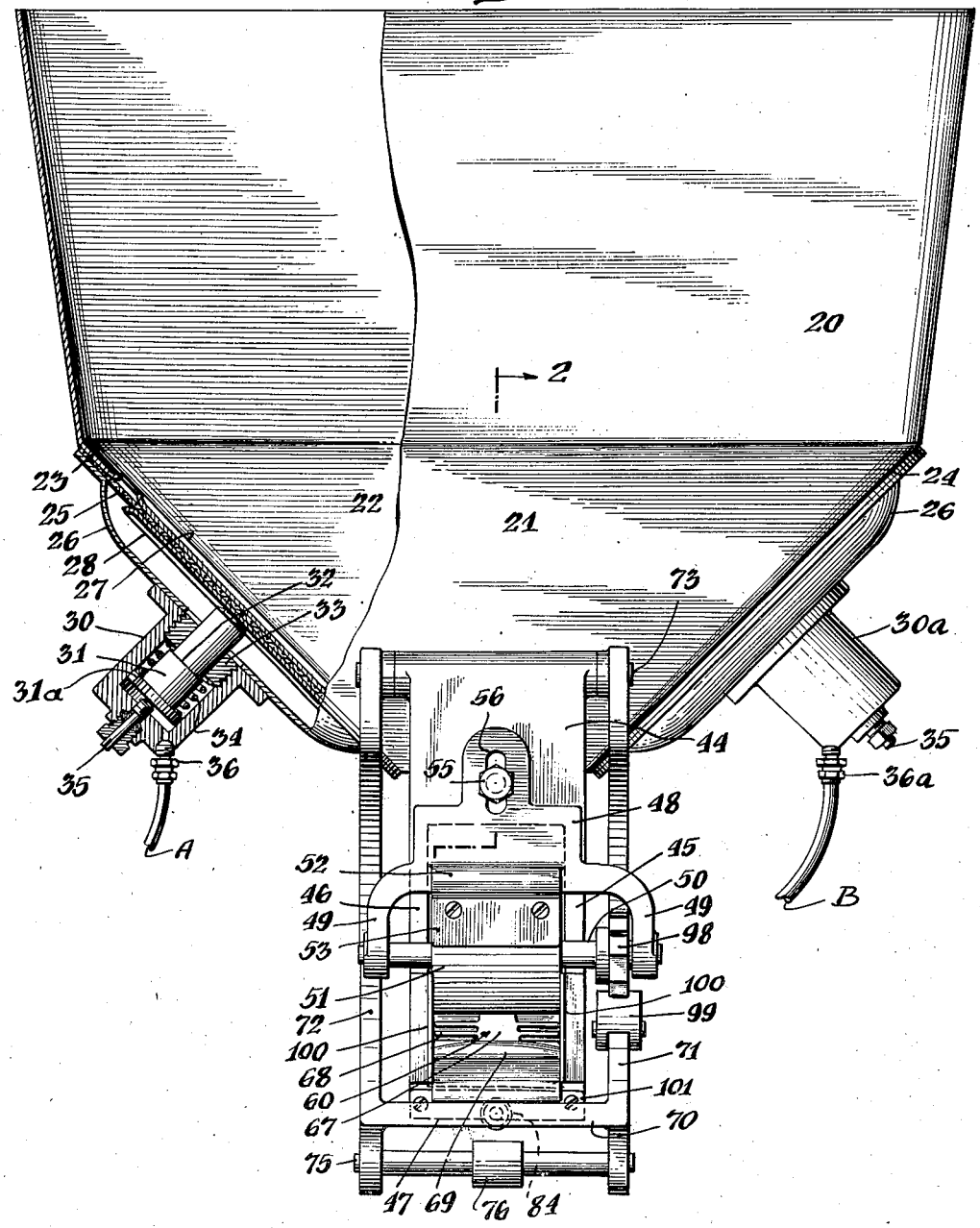

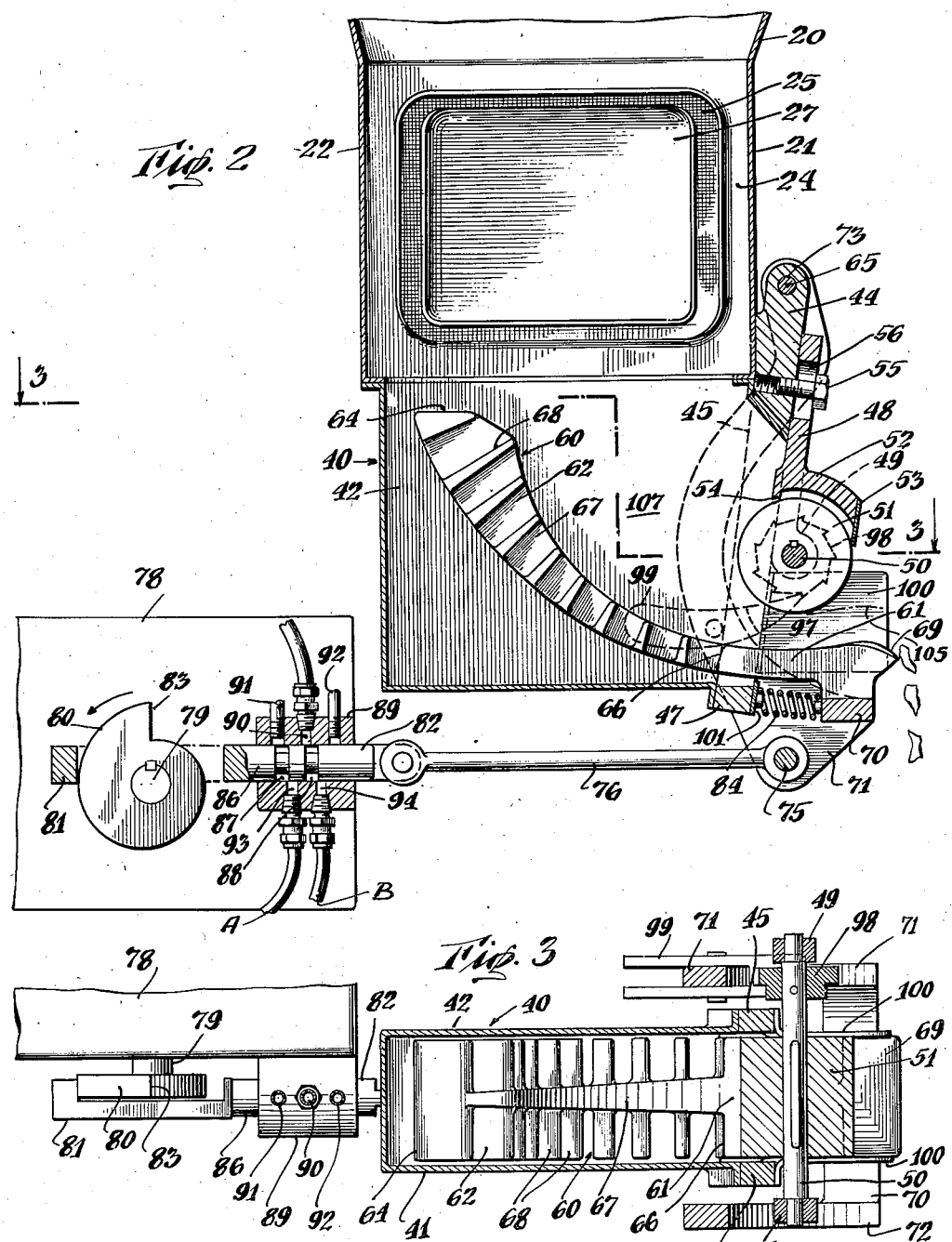

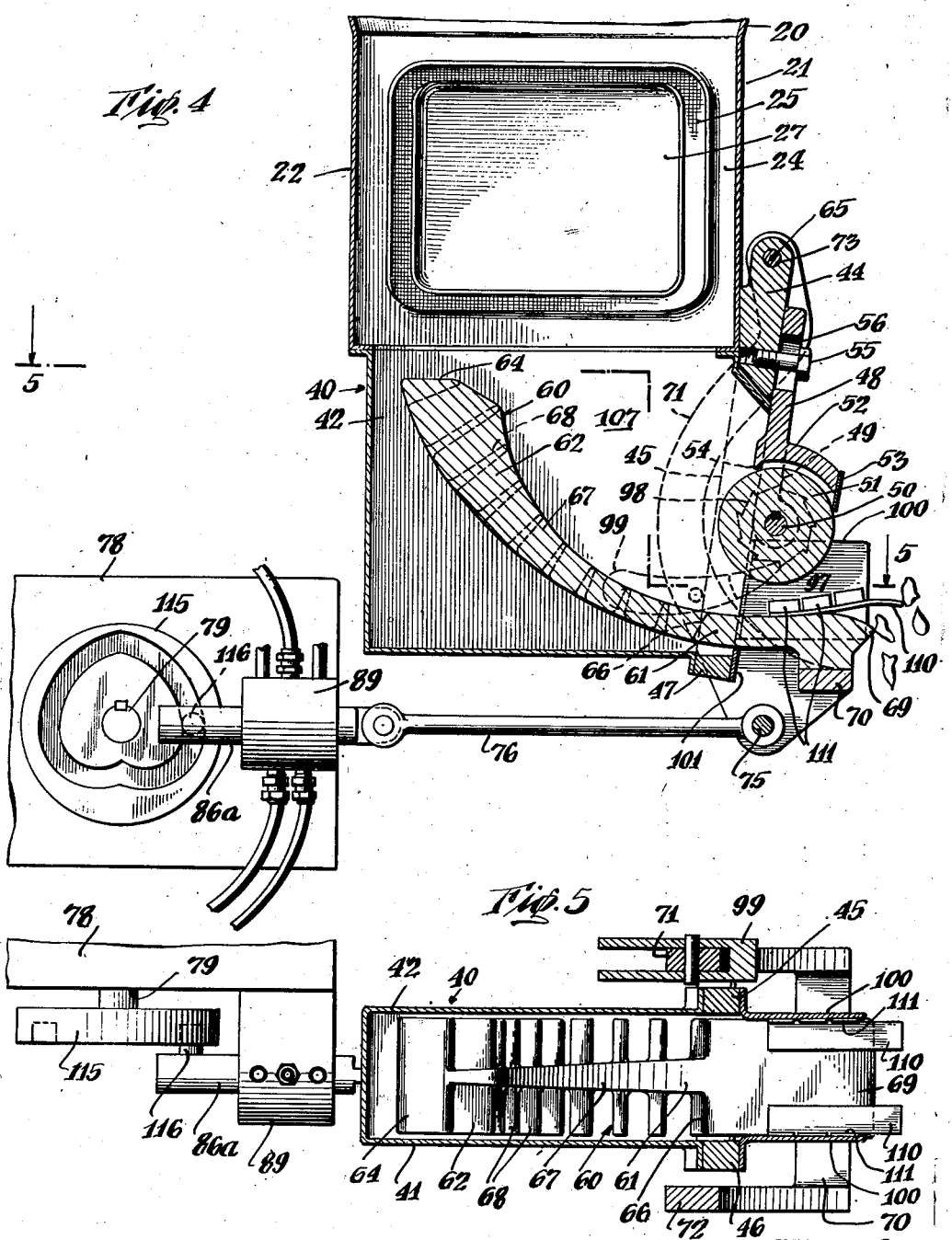

2,381,802

UNITED STATES PATENT OFFICE 2,381,802

DRY CHEMICAL FEEDER

George Martin Booth, Westfield, and John Scott Ballard, Montclair, N. J., assignors to Wallace & Tiernan Co. Inc., Belleville, N. J., a corporation of New York Application October 23, 1941, Serial No. 416,256

17 Claims. (Cl. 222—200)

This invention relates to apparatus for feeding dry, divided material, for example dry chemicals in powder or granular form, and an important object is to provide an improved apparatus which may be charged with a substantial quantity of such material and which will automatically feed the material at a controlled rate and preferably in a substantially continuous stream, as for the introduction of the material into other dry material or into a stream or other body of fluid, or for any use where a measured and continuous or substantially continuous feed of dry, pulverulent material is desired.

Dry chemical feeders heretofore available have usually been characterized by at least one or another of several shortcomings, including: a tendency to leak, as between moving mechanical parts; a tendency to wear moving parts excessively, particularly where substantial areas of moving parts are in contact or near contact with each other and where the chemical is of relatively abrasive character; and a tendency, particularly in the case of many extremely fine powders or of materials that otherwise tend to cake or stick together, for the moving parts to become clogged or to fail in their effect. For instance, where paddles or the like have been used to agitate the material in a feed hopper, the effect may be merely to pack the material and produce cavities in which the agitating elements travel, without shaking down the material at all. In some cases, where feed of the chemical from the bottom of a hopper is dependent on an oscillating horizontal plate to carry such material beyond an aperture, and where control of the rate of feed is attained by adjustment of the length of scillating stroke, it is impossible to obtain any satisfactory feed when only a small flow is required. In these and like devices, moreover, the material sometimes merely packs in the hopper, or the feed element may otherwise slip with respect to the material over it, so that insufficient quantities are carried away by the moving element. On the other hand, some types of apparatus are impossible to regulate with a very free-flowing chemical; it simply gushes out and there is insufficient control of the rate of feed.

Accordingly, important objects of the present invention are to overcome or minimize one or more of these and other disadvantages found in feeding devices heretofore available. Further objects are to provide more efficient and more adaptable apparatus for causing the material to pass from a bulk thereof to the point of feed; and to provide for an avoidance of packing, sticking or slipping, particularly in the case of chemicals having such tendencies. Another object is to provide structure more readily controllable in rate of feed, throughout a wide range, and also to provide apparatus which will feed satisfactorily with any of a wide variety of materials, ranging from free-flowing, granular products to extremely fine, pulverulent material of caking tendency. A further object is to provide simple and yet novel and highly efficient mechanical arrangements for agitating, breaking up and moving the masses of material; and another object is to provide apparatus of the character described, wherein reciprocating movement is employed for efficient agitation of the bulk of material, and yet wherein a continuous or substantially continuous stream of material is discharged by the feeding operation.

Other objects and advantages include those hereinabove stated, and such as are incidental to or inherent in the structure and operation of the invention, which may be conveniently explained by reference to certain advantageous embodiments thereof, set forth by way of example in the accompanying drawings. Referring to the drawings, Fig. 1 is a front elevation, with a certain portion in vertical section, of one presently preferred feeding device embodying the invention;

Fig. 2 is a side view, chiefly in section on line 2—2 of Fig. 1;

Fig. 3 is a section on line 3—3 of Fig. 2; and

Figs. 4 and 5 are views corresponding to Figs. 2 and 3 respectively, but showing certain modifications in the structure.

Referring first to Figs 1 to 3, the embodiment therein illustrated includes an upper hopper or storage section 20, suitably open at its top and preferably having walls of a steep slope, so that the chemical or other powdered material to be fed may pass down through the section, by gravity, without agitation. It will be appreciated that the dimensions of this storage section may conveniently be such as to hold enough chemical for continuous feeding operation over any desired predetermined time, say 24 hours or longer.

The storage section 20, conveniently made of sheet steel or like material, has an open rectangular bottom which connects with the similar open top of an agitated hopper section (also of sheet steel or the like), having vertical front and back walls 21, 22 and inwardly sloping side walls 23, 24. The slope of the side walls is preferably substantial, for example at an angle of about 45° as shown, for optimum agitation and free movement of the chemical down through the open, narrow, rectangular bottom of this hopper section. The apparatus includes means for displacing the sloping side walls 23, 24 throughout substantially their entire areas, and to that end, each wall includes a diaphragm structure comprising a flexible sheet 25, say of canvas, flannel, rubber, rubber-treated fabric, leather or the like which covers an opening in the wall that is preferably coextensive, as nearly as possible, with the wall. The flexible member 25 is peripherally clamped in place by a shallow concave plate, of sheet steel or the like 26. For rigidity and efficient agitating action, substantially the entire free area of the sheet 25 is faced, on opposite sides, by a pair of plates or steel sheets 27, 28, which are suitably fastened to the flexible membrane 25, whereby this entire diaphragm-plate assembly 27, 28, may be moved, in a direction perpendicular to its surface, toward and away from the interior of the hopper section.

For actuation of the diaphragm assembly, each plate 26 carries a cylinder 30, within which is disposed a piston 31 that has a stop shoulder 32 and projects through suitable packing 33 at the plate end of the cylinder and is adapted to engage the outer surface of the diaphragm plate 28, as shown. A coil spring 34 surrounds the piston, abutting a notched guide flange 31a, and normally biases the piston in an outward direction with respect to the diaphragm. An adjustable stop screw 35 is disposed to limit the outward displacement of the piston 31 by the spring, and thus to afford adjustment of the amount of agitation per stroke, as may suit the requirements of different chemicals. The head of the cylinder includes an inlet 36, whereby fluid, e. g., oil or water under pressure, may be admitted to the cylinder, to move the piston and the diaphragm structure in one direction, and through which fluid may escape from the cylinder, for return of the piston by the spring 34 and consequent return of the diaphragm structure by the weight of the chemical and by the weight and resiliency of the diaphragm assembly. For convenience of separate identification hereinbelow, the two cylinders have been marked 30, 30a and their inlets 36, 36a, respectively in the drawing; it being understood that the structures are identical for each diaphragm, as described hereinabove.

The narrow, rectangular bottom of the hopper opens into a conforming feed box 40, which may have a rectangular or other suitable shape and which preferably includes parallel side walls 41, 42. The front vertical side of the feed box conveniently comprises means providing a feed aperture near the bottom of the box, through which the feeding structure presently to be described is adapted to reciprocate and thus to carry successive portions of the chemical out for the feeding operation. Although in some instances a simple gate or apertured plate structure may be used, the illustrated apparatus advantageously includes a frame member affixed to the box, conveniently at a somewhat inwardly sloping angle, so as to surround and partially enclose the front face of the box. As shown, the frame member includes an upper or body portion 44, side arms 45, 46 and a lower cross piece 47, conveniently mounted to suitable flanges of the sheet steel or like material of which the box is constructed.

The gate structure further includes a roller carrier having a body portion 48, and outwardly extending arms 49, which provide appropriate bearings for the opposite ends of a shaft 50 carrying a roller 51. The roller, which may conveniently have a suitably abrasion and corrosion resistant metal surface, has a horizontal axis and the disposition of the roller, frame member 44 and carrier member 48 are such that the front face of the box 40 is effectively closed except for a rectangular opening between the lower side of the roller and the upper edge of the frame cross member 47. The roller carrier or bracket includes an apron 52 which extends out over the upper surface of the roller but somewhat spaced therefrom, and carries a scraper blade 53, to wipe the chemical or other material from the surface of the roller. The inner face of the bracket portion 48 has a shoulder or flange 54 which ordinarily need not scrape the surface of the roller but serves somewhat as a dam to prevent excessive escape of material into the space between the roller and the apron 52. The carrier assembly 48, 49, 52 is mounted to the member 44 by a bolt 55 passing through a vertical slot 56 in the bracket, whereby the bracket and roller may be adjusted vertically, to vary the size of the feed aperture below the roller.

For displacement of the chemical within and out of the feed box, there is provided a feed member generally designated 60, conveniently made as a single casting of iron or the like, and preferably having a curved, wedge shape as now to be described. This member 60 comprises a generally horizontally-disposed portion 61 and an upturned apertured, material-advancing portion 62. As shown, the portion 61 is a heavy plate-like part disposed to extend out through the feed aperture and with the adjacent portion 62 extending rearwardly up into the feed box 40, the whole having preferably a curved structure and being substantially and progressively thickened toward its upper end 64 to provide a wedging action on the material in the box. The curve of the upper or inner surface of the feed member (over both its portions) may be, for example, an arc of a spiral with its center at the point 65 of the frame portion 44, about which the feed member swings as herein-below explained. The lower surface of the member 60 may conveniently lie in an arc of a circle about the same center.

As shown, the feed portion 61 of the member 60 is solid throughout its surface, e. g., back to a suitable point 66 behind the feed aperture, while the remaining or wedging portion 62 comprises a central rib 67 and laterally extending fins 68. The ends of the fins 68 and the sides of the solid portion 61 preferably have an appreciable clearance with the side walls 41, 42 of the box 40, to avoid abrasion and consequent wear by the material being fed. The forward end 69 of the feed member is conveniently convex, curving downwardly at the front and likewise at the sides, so that as the material moves toward and off the front end of the member it tends to break away from itself, and thus fall readily and in comparatively small pieces from the end of the member.

A cross piece 70 is bolted to the underside of the feed member, at the front of its portion 61, the cross piece conveniently being an integral part of a casting which also comprises the vertically disposed arms 71, 72. The arms 71, 72 are pivoted on a shaft 73 which is carried horizontally, at the point 65, in the upper extremity of the frame member 44. The arms 71, 72 are thus adapted to rock about the axis of the shaft 73 and correspondingly to rock the feed member 60 about the same axis, so that the upper surface of the feed member portion 61 may be reciprocated back and forth through the feed aperture below the roller 51, and the wedge portion 62 of the member is adapted to move through a path, that, as seen in Fig. 2, extends generally in a direction downward to the right and upward to the left, to agitate and wedge the chemical toward the feed aperture.

The arms 71, 72 have downwardly projecting portions, as shown, to support a horizontal shaft 75 upon which is pivoted one end of a link 76 for reciprocating drive of the arms and feed member. Driving power for the link 76 may be derived from any suitable form of variable speed unit (for example embodying hydraulic, electrical or other source of power) which need not be shown in detail and is therefore simply designated by the box 78. For example, the variable speed driving unit may be such as to have a drive shaft 79 and to include means (not shown) for continuously rotating the shaft at a speed which may be adjusted as desired.

Although other cam or coupling means may be employed, the illustrated structure includes a spiral cam 80 mounted on the shaft 79 and adapted to move a follower arm 81 toward the left, as seen in Fig. 2. The follower arm is mounted to slide in a horizontal direction and at its outer end 82 is pivoted to the link 76 for transmitting motion thereto. Return of the assembly, when the follower 81 drops from the summit of the cam rise 83, is achieved by the coil spring 84, conveniently disposed, under compression, between the cross piece 76 and the lower frame cross piece 47.

For operation of the diaphragm walls of the hopper, through the instrumentality of the cylinders 30, 30a, suitable valve structure is provided and preferably arranged for operation in synchronism with the feeding mechanism hereinabove described. Although the diaphragms may in some cases be otherwise operated, for example so that they simultaneously move toward each other and simultaneously fall back from each other, it is at present preferred to displace them simultaneously in opposite directions, so as to effect a movement of the entire mass of chemical in the hopper in a sidewise direction from one wall 23 toward the other wall 24, and then back. To these ends, Figs. 2 and 3 illustrate a suitable valve structure, which is conveniently embodied in and about the follower arm 81 intermediate the cam 80 and the end 82 thereof.

As shown in Fig. 2, this portion 86 of the arm includes a pair of annular grooves 87, 88 spaced from each other and adapted to cooperate with suitable ports in a valve block 89 through which the member 86 slides. The block 89 includes, at one side, a central port 90 to extend to a source of fluid under pressure (not shown), for example oil under pressure, and spaced therefrom a pair of exhaust ports 91, 92. On the opposite side of the member 86, the block 89 includes a spaced pair of ports 93, 94, respectively connected by suitable tubing (not fully shown) to the inlets 36, 36a of the diaphragm driving cylinders 30, 30a, the ports 93, 94 being disposed, as shown respectively intermediate the ports 91, 90 and the ports 90, 92, but on the opposite side of the member 86. For clarity of illustration the connecting tubing is only partially shown, it being understood that the parts A, B, in Fig. 2 are respectively connected to the parts A, B, in Fig. 1; and it will also be understood that the exhaust ports 91, 92 may be suitably connected by tubing (not shown) to waste or for re-use of the fluid.

The arrangement of the several ports and of the grooves 87 and 88 is such that as the follower 81 is carried out by the higher portions of the cam 80, the groove 87 provides a connection between the ports 93, of diaphragm cylinder 30, and exhaust port 91, permitting the corresponding piston to be relaxed by its spring and the corresponding diaphragm to remain in its outward position. At the same time, the groove 88 is disposed to connect port 90 with the port 94 of the other diaphragm operating cylinder, maintaining a supply of fluid under pressure to the latter and keeping the corresponding diaphragm displaced inwardly of the hopper. When the cam 80 carries its summit 83 past the follower 81, and the spring 84 correspondingly moves the member 86 to the right as seen in Fig. 2, the valve connections are rapidly changed, so that the port 94 is connected to the exhaust 92 (permitting retraction of the diaphragm in wall 24) and the port 93 is connected to the fluid supply 90, effecting smooth inward displacement of the diaphragm in wall 23. Thereafter, upon short further travel of the cam, the valve element 86 is again sufficiently shifted, in the opposite direction, to resume its previously described position, whereupon the diaphragm in wall 23 is slowly relaxed and the diaphragm in wall 24 is immediately pushed inwardly of the hopper.

As clearly shown in the accompanying drawings and hereinabove explained, the movement of each of the diaphragms is in a direction substantially perpendicular to its surface and to the surface of the respectively associated sloping wall, of which the diaphragm forms a substantial part. Also as the movements of the diaphragms on the opposite sloping walls are alternate rather than simultaneous there will be almost no tendency to compact the material being handled. On the other hand the movement of each diaphragm as shown will have a tendency to break up the material being handled by exerting forces in an upwardly inclined direction on such material and tending to cause relative movement of parts thereof on inclined shear planes. Again as the movements of the two opposite diaphragms are alternate, such breaking up will be progressive as the material feeds through the hopper and on sloping shear planes which intersect at a substantial angle to one another, shown in the drawings as substantially 90 degrees. This in practice affords superior results in the handling of many types of chemical materials as set forth hereinabove.

Referring again to the feeding mechanism, it will be noted that the shaft 50 of the feed roller 51 carries a ratchet 98, with which cooperates a pawl 99 pivoted on the arm 71. The pawl has an appropriate rearward extension, counterweighting it so as to keep it in engagement with the ratchet; and it will now be seen that the arrangement of the ratchet and pawl is such that upon each forward swing of the arm 71 (to the right as seen in Fig. 2) the roller 51 is rotated in a counter-clockwise direction through a predetermined angle, and the motion is such as to advance the lower surface of the roller in the same direction, and preferably at the same speed as the simultaneously traveling upper surface of the feed wedge portion 61. On the return stroke of the arm 71 and the feed wedge, the pawl moves idly over the ratchet, and the roller does not move.

For guiding the ribbon of chemical which the feed wedge carries out of the feed aperture, there are provided spaced guiding plates 100, 100 which are disposed in a vertical position and extend out from the box along the sides of the feed wedge, as shown. Advantageously, the guide plates 100 may be made of resilient sheet metal, to keep them in actual abutment with the adjacent side faces of the feed wedge and prevent appreciable escape of the chemical as the wedge slides back and forth. For preventing leakage of the chemical beneath the feed wedge, a scraper plate 101 is disposed on the outer surface of the frame cross portion 47 and extends into scraping relation with the under side of the feed member portion 61.

The illustrated structure provides a remarkably efficient and satisfactory arrangement for feeding dry, divided material, such as dry chemicals. The supply of chemical in the storage portion 20 gradually falls by gravity (it being understood that the entire enclosure is more or less solidly filled with chemical in loading) into the agitated hopper portion. Here, in timed relation with the reciprocating feed wedge and associated parts, the mass of chemical is periodically displaced or agitated by the sloping walls 23, 24, and it has been found that the preferred back-and-forth displacement of the mass is particularly effective in loosening the chemical and in cooperating with the feed wedge 60 for promoting downward travel of the chemical out of the hopper and through the feed box 40 to the feed aperture. As the feed wedge 60 swings or reciprocates back and forth, a stream or ribbon of the chemical is then delivered out through the feed aperture, i. e., lying on the upper surface of the portion 61 of this member.

When the wedge member is moved generally to the right as seen in Fig. 2, its upper or wedging portion 62 pushes against the mass of chemical ahead of it and urges the chemical in a downwardly direction toward the feed aperture, thus forming and carrying out the described ribbon of chemical (indicated by the dot and dash boundary 105) on the upper surface of the member portion 61. When the feed wedge moves back, i. e., to the left as seen in Fig. 2., its outer portion 61 slides beneath the ribbon of chemical, permitting the outer parts of the latter to break away and fall down in the desired stream of feed. At the same time, the wedge portion 62 moves backwardly and upwardly into the mass of chemical pressing down from the hopper portion, the upper and substantially horizontal extremity of the wedge effecting a circulation of the chemical in a direction somewhat upwardly but chiefly toward the front of the feed box and thence downwardly into the space (in the feed box area 107) enlarged or left free by the upward movement of the thicker parts of the wedge. Thereupon a further stroke of the wedge in the reverse or forward direction again wedges the chemical and promotes its travel by gravity, downwardly and outwardly through the feed aperture, in the described ribbon.

The apertures in the wedge, i. e., between the fins 68, cooperate substantially in the feeding action. In the first place, they relieve such back pressure as otherwise might be exerted by the stagnant chemical in the power part of the box. Normally, moreover, the amount of chemical passing through these openings is small, so that the openings themselves contain practically stagnant chemical which therefore presents a surface toward the chemical being fed (i. e., an effective surface for the feed wedge) which is of the same nature as the chemical, and indeed is itself made, so to speak, of the chemical. This arrangement affords practically maximum friction, as has been found to be most desirable, for the wedging and pushing action of the feed wedge on the material in the area 97. Thus the apertured wedge member always has a highly frictional surface, in advantageous contradistinction to feeding members having a solid surface that is originally smooth or is made so by wear.

It will be noted that the structure, in its preferred form, and mode of operation, is such that the reciprocation of the feed wedge always has the same length of stroke, and that the adjustment of the rate of feed is made by changing the frequency or speed of stroke, or as in the apparatus shown, by simultaneous change of both factors. In this way, difficulties heretofore found in obtaining very slow rates of feed with devices of the type in which the length of stroke must be adjusted, are entirely obviated, and at the same time, a more accurate and reliable arrangement for feed adjustment is afforded—e. g., in the illustrated device, simply by adjusting the speed of rotation of the shaft 79 in the variable speed drive unit.

Furthermore, it will be noted that the device is adapted to provide a feed of the chemical which is at least substantially continuous, despite the use of advantageously reciprocating feed parts. It will be seen that as the cam 80 gradually moves the follower 81 toward the summit of the cam rise, the feed wedge 60 is moving back relatively slowly, and in accordance with a preferred configuration for the cam, at a substantially constant speed throughout this backward stroke. The return of the feed element 60 is effected rapidly and indeed almost instantaneously by the drop of the follower from the cam rise and the rapid action of the spring 84. Since the structure shown feeds only on the backward stroke, it will thus be seen that during the substantially constant and relatively slow travel of this stroke, material is continuously falling clear of the front end 69 of the feed wedge, and the return stroke affords only an inconsiderable interruption in this otherwise entirely continuous discharge of the dry material. Moreover, as will now be appreciated, the feed will be similarly continuous for all speeds of operation of the device.

As explained, and as arranged by virute of means such as the valve box 89 and its attendant parts, the hopper is agitated in synchronism with the movement of the feed wedge and conveniently in such fashion that in each cycle of wedge reciprocation there is a movement of the mass of material in the hopper back and forth across the hopper opening. In this way, the hopper agitation is appropriately proportioned to the actual feeding action, and is neither insufficient for the desired substantially continuous movement of material through the device from the storage section 20, nor so excessive (particularly at slow rates of feed) as to effect undue agitation and to cause packing of the material in the hopper. It will be particularly noted that the rate of agitation is exactly adjustable with the rate of feed, and conveniently by the very same means.

Although in some cases, as with easily fed materials, a simple gate may be employed or a stationary gate member having a lower curved surface of a configuration similar to that of the roller 51, the periodically actuated and synchronized roller cooperates notably in the feeding action. By the extremely simple mechanism shown, the roller 51 is advanced each time the feed member 60 executes its forward stroke, so that the ribbon of material is carried out of the aperture between two surfaces which are moving in the same direction and at the same speed. On the reverse stroke, when the feed wedge returns, the roller is stationary (being held by its inertia and conveniently by some friction in its bearings) and thus cooperates with the mass of material in the feed box portion 107 to prevent retraction of material into the feed box and thereby to promote the desired feed by descent of the chemical from the outer end 69 of the wedge. Moreover, the roller is exactly timed with the reciprocating operation of all the other instrumentalities, and its rate of operation is automatically adjusted with them and conveniently by the same means, for true proportionality with the desired rate of feed.

The arrangement of the several agitating and material-displacing instrumentalities is such as to eliminate or reduce the exposure of bearing surfaces to bodies of the dry chemical in the apparatus; the arrangement of the diaphragms 25-27 and the feed wedge 60, for example, being such as to require substantially no rubbing action between metal surfaces inside the enclosure, and to require no operating bearings or the like within the enclosure. In this way, the wear of metal parts is greatly reduced, minimizing opportunities for leakage and avoiding the necessity of frequent replacements to obtain the desired operation.

A further advantage in the diaphragm operating structure is that the arrangement may employ a fluid pressure-operated device for actuating the diaphragms, so as to afford smooth diaphragm displacements which are easily controlled as to frequency and as to length of stroke, and at the same time the structure is such as to prevent any possibility of leakage of a driving liquid into the chemical under feed. Such operating liquid is positively separated from the diaphragms themselves, i. e., is confined within the separate actuating cylinders 30, 30a.

It will thus be seen that the described structure provides an efficient and thoroughly satisfactory dry feeding device, which will operate reliably over long periods of time and which is susceptible of adjustment over a wide range of feeding rates and may effectively handle a great variety of different dry materials, such as powdered, activated carbon (a fluffy material), lime, clay (e. g., diatomaceous earth), or other very finely divided materials which normally create difficulty in feeding because of lightness in weight or a tendency to pack or cake. It will be understood that the substantially continuous stream of material falling from the end 69 of the feed wedge may drop to any desired apparatus or instrumentality for the use of the material, such as a passing stream of other dry material or of fluid, or a container of such other material or fluid (for example, liquid undergoing a treatment that requires continuous increments of reagent), or to other conduit or conveyor means—of which structures or devices no illustration need be given.

Certain modifications of the feeder are shown in Figs. 4 and 5, wherein for the sake of brevity of illustration, there are shown only the instrumentalities immediately related to the modified or additional features. It will be understood that the structure of the feed wedge 60, the roller 51, the feed box, the hopper and the agitating diaphragms, and associate parts, may be the same as hereinabove shown and described. In Figs. 4 and 5, the structure is designed for what is essentially a truly continuous feed of the dry chemical. To that end, a pair of outwardly extending and upwardly sloping scraper plates 110 are disposed beside the inner faces of the guide plates 100, and are attached thereto (as by welding) by appropriate flaps 111 turned up from the plates 110, which themselves lie in a generally horizontal position as shown. The inner ends of the plates extend into scraping proximity with the upper surface of the wedge portion 61 and the outer end of the plates extends up and away from the wedge surface. Conveniently, the total transverse dimension of the two plates, i. e., across the path of movement of the feed wedge, is approximately one-half the total width of the wedge.

It will thus be seen that the effect of the scraper plates 110 is to divide the ribbon of dry chemical so that approximately the central half of the ribbon is carried on and fed from the outer end of the wedge portion 61, while the remainder of the ribbon is pushed along the two scraper plates in corresponding narrow ribbons of about one-quarter width each. In consequence, as the wedge moves backward, (to the left as seen in Fig. 4), material is fed by falling away from its outer end as previously described in connection with Figs. 1 to 3. On the return or forward stroke of the wedge member, the narrow ribbons of material are built up and pushed along the stationary scraper plates 110, so that the material then similarly descends from the ends of these plates during each such forward stroke. In this way, feed of the material is divided and the result is a practically continuous feed, throughout both strokes of the feed member.

For operation of this modified structure, it is ordinarily preferable to actuate the feeding parts with strokes of equal duration in both directions, and to that end the variable speed drive unit 78, in Figs. 4 and 5, carries on its drive shaft 79, a heart-shaped box cam 115, which has its heart-shaped groove engaged by a lateral follower 116 carried by the follower drive member 86a. With this construction, the link 76 is reciprocated with an even and substantially constant speed stroke in each direction, thereby providing, as hereinabove described, practically continuous, even feed of chemical from the ends of the instrumentalities that extend from the feed aperture. It will be understood that the member 86a traverses the valve box 89, and the valve structure therein may conveniently be identical with that disclosed in Fig. 2 for the correspondingly proportioned reciprocation of the hopper diaphragms (as shown in Fig. 1), with periodic displacements of them in the same manner as hereinabove explained.

It will be noted that in the structure of Figs. 4 and 5 no return spring is needed for the outward movement of the arms 71, 72 and the feed wedge, inasmuch as the driving unit, through the operation of cam 115, positively drives the parts in each direction. It will now be appreciated that the structure of Figs. 4 and 5, is characterized by the same advantages of reliability, accuracy, ease of adjustment and synchronized cooperation of agitating and feeding elements, as the apparatus of Figs. 1 to 3; at the same time, the modified structure affords, as may be especially desirable for many purposes, a dry chemical feed which is essentially of a truly continuous type, viz., a practically constant stream of material, which is varied in amount only by the actual, desired adjustment of the apparatus, e. g., by adjustment of the speed of the variable drive unit.

In accordance with the provisions of the patent statutes, there is herein described the principle of operation of the invention, together with the apparatus now considered to represent the best embodiments thereof, but it is to be understood that the apparatus disclosed is only illustrative and that the invention may be carried out by other means. Also, while it is designed to use the various features and elements in the combinations and relations described, some of these may be altered and others omitted and features of the modifications may be interchanged without interfering with the more general results outlined, and the invention extends to such use within the scope of the appended claims.

What is claimed is:

1. In apparatus for feeding dry, divided material, in combination, a feed hopper for the material, having a downwardly and inwardly sloping wall comprising a diaphragm, for guiding the material to a discharge opening at the lower end of the hopper, a feed box mounted to receive material from said lower end of the hopper, said box including means providing a feed aperture in a wall thereof, a feed member disposed in the box and mounted for reciprocation to engage and carry successive portions of material through the feed aperture and driving means including means for reciprocating said feed member and said diaphragm in synchronism.

2. In apparatus for feeding dry, divided material, in combination, a feed hopper for the material including a pair of oppositely disposed, inwardly and downwardly sloping walls to guide the material to a discharge opening at the bottom of the hopper, each of said walls including a diaphragm to be oscillated for facilitating movement of material to said opening, a feed box receiving material at said opening and having a feed aperture at a lower portion thereof, a feed member disposed in said box and having a substantially horizontally disposed surface extending through said feed aperture, said feed member including an upturned portion within the box, extending toward the discharge opening of the hopper, and said feed member including apertures through the portion of same that is disposed within the box, whereby the surface of said member within the box may simulate a surface consisting of the material being fed, and said feed member being mounted for a reciprocation in a direction for carrying successive portions of the material through the feed aperture, driving means for the feed member and the diaphragms including means repeatedly advancing the feed member at a substantially constant rate in at least one direction of stroke, and synchronized control means for effecting a displacement of each diaphragm, for each stroke of the feed member.

3. In apparatus for feeding dry, divided material, in combination, a hopper for holding a supply of material and discharging same through the bottom of the hopper, a diaphragm forming a wall portion of the hopper to abut the material therein, an enclosure receiving the material from said hopper, a reciprocable feed member for advancing material out of said enclosure, said feed member including apertures therein to be filled with the material to provide substantial frictional engagement with the material being advanced, and driving means for displacing the diaphragm and for reciprocating the feed member in timed relation, said driving means being adjustable in rate of operation independently of the length of stroke of the member, to vary the rate of feed.

4. The apparatus of claim 3 wherein the feed member includes a material-carrying portion adapted to extend out of the enclosure whereby material falls from said portion as the member moves into the enclosure, and the driving means includes means for advancing the member slowly into the enclosure and for rapidly returning same, the approximate continuous feed of the material by descent from said member portion.

5. The apparatus of claim 3, wherein the feed member includes a material-carrying portion adapted to extend out of the enclosure whereby material falls from said portion as the member moves into the enclosure, and which includes stationary means engaging the said portion of the member for receiving a part of the material carried by the latter, said stationary means being disposed for the member to push the material off the said means during the return of the member, and wherein the driving means includes means advancing the member at a substantially constant speed in each direction, for substantially constant feed of the material by descent alternately from the said member portion and the said stationary means.

6. In apparatus for feeding dry, divided material, in combination, a feed hopper for the material, having a pair of opposite, inwardly and downwardly sloping walls for directing material to a discharge opening at the lower end of the hopper, each of said walls including a diaphragm forming a major portion of the wall and each of said diaphragms comprising a rigid plate forming substantially the greater part of the area of its wall and flexible means mounting said plate for movement in a direction perpendicular to its surface, and means for alternately oscillating each plate in said direction, to facilitate advance of the material to the discharge opening of the hopper, by causing a breaking up of the material in the hopper along progressively intersecting diagonal shear planes without compacting such material.

7. In apparatus for feeding dry, divided material, in combination, a hopper having opposite walls inwardly sloping toward a discharge opening, time-controlled means for oscillating said walls in timed relation and in directions respectively substantially perpendicular thereto to displace a body of material in the hopper back and forth across the discharge opening, and timing means controlling the first named means to cause said walls to move alternately toward the body of the material to facilitate advance of the material to the discharge opening of the hopper by causing a breaking up of the material in the hopper along progressively intersecting diagonal shear planes without compacting such material.

8. In apparatus for feeding dry, divided material, in combination, a hopper having a discharge opening, a pair of oppositely disposed diaphragms providing walls leading to said opening, each of said diaphragms comprising a rigid plate and flexible mounting means to permit movement of the plate, reciprocating means for moving said plates to agitate material contained in the hopper, said reciprocating means comprising an expansible chamber for each diaphragm, spaced therefrom, each chamber having a member displaced thereby for moving the diaphragm inwardly of the hopper, and spring means for returning the member, and means for controlling the supply of fluid under pressure to the chambers, alternately to establish pressure in one and relieve pressure in the other simultaneously and then to establish pressure in the second and relieve pressure in the first simultaneously.

9. In apparatus for feeding dry, divided material, in combination, a feed box having an open top adapted to receive material from a feed hopper disposed over the same, said box having a feed aperture at a lower portion of a side wall thereof, and said box being entirely closed at the bottom and all sides except for said feed aperture, a feed member extending into said box through the aperture and having an upper surface adapted to carry material out of the box through the aperture, said feed member being wedge-shaped, tapering toward the feed aperture, to promote displacement of the material to the feed aperture and said feed member being apertured to relieve pressure of material along and beneath the member, and means mounting said feed member for reciprocating movement through the aperture in a direction substantially perpendicular to the plane of the aperture.

10. In apparatus for feeding dry, divided material, in combination, a feed box having an opening through which material passes into the box, and having a feed aperture spaced from said opening, said box being entirely closed except for said opening and said feed aperture, and said opening being disposed at an upper part of the box substantially above the feed aperture, a feed member including a portion disposed within the box and curved to extend from the vicinity of said aperture to a place in proximity to said feed opening, said feed member being wedge-shaped, tapering toward the feed aperture, to wedge the material toward the aperture, and said feed member including a surface for moving material out through the feed aperture, and means for reciprocating said feed member to agitate the material entering and substantially filling the box and to carry successive portions of the same through the feed opening.

11. In apparatus for feeding dry, divided material, in combination, a feed box having an opening to receive material, and having a feed aperture, a feed member extending into the box and having a surface to receive material therein and effect displacement of successive portions of same out through the feed aperture, said feed member having an opposite surface engaging one side of said feed aperture to prevent egress of material except over the material-moving surface of the member, roller means mounted to provide an opposite side of the feed aperture, means for reciprocating the feed member through the feed aperture, and means for repeatedly effecting rotative displacement of the roller means to move its surface in the same direction as the feed member during each stroke of the latter outwardly of the feed aperture.

12. In apparatus for feeding dry, divided material, in combination, a feed box having an opening to receive the material and having spaced parallel walls extending from said opening and having a wall at one side of said spaced walls, means providing a feed aperture in said last mentioned wall, a feed member extending through said feed aperture and having a portion extending within the box and curved toward the first mentioned opening, so that the feed member has an outer end outside the feed aperture and an inner end within the box at the extremity of said portion which extends toward the first-mentioned opening, said feed member having a correspondingly concave surface for abutment with the material in the box and for carrying successive portions of material through the feed aperture, and said feed member being progressively thicker toward its inner end whereby the member, upon displacement toward and through the feed opening is adapted to wedge the material from the first mentioned opening toward the feed aperture, and means for reciprocating said feed member, said feed box being closed at its bottom and at its sides except for said feed aperture.

13. The apparatus of claim 12 which includes a roller adapted to form one side of the feed aperture and having its axis parallel to the feed surface of the feed member and disposed transversely of the path of reciprocation thereof, a ratchet for rotating said roller in a direction for outward movement of its aperture-facing side, and means including a pawl operated by the feed member reciprocating means, for displacing the ratchet during each outward stroke of the feed member.

14. The apparatus of claim 12 in which the feed member includes, at the portion thereof which extends through the feed aperture, a solid portion extending to the adjacent sides of the aperture, whereby the actual opening of the aperture is confined to a space between the feed surface of the member and one side of the aperture, and in which the portion of the member extending within the box comprises supporting means extending lengthwise thereof, and fins extending from said supporting means to provide apertures in the member, said member extending into close proximity with the walls of the box past which it is reciprocated.

15. In apparatus for feeding dry, divided material, in combination, a feed box having an open top adapted to receive and be substantially filled with material from a feed hopper disposed over the same, said box having a feed aperture at a lower portion of a side wall thereof, and said box being entirely closed at the bottom and all sides except for said feed aperture, a feed member extending into said box through the aperture and having an upper surface adapted to carry material out of the box through the aperture, said feed member extending upwardly in the box toward the top thereof and said feed member being apertured to relieve pressure of material along and beneath the member, and means located wholly outside said feed box and connected to that portion of said feed member which extends out through said feed aperture constituting the sole means for mounting said feed member and for reciprocating it within said feed box and through the aperture.

16. The apparatus of claim 15 wherein the feed member is shaped to fit closely the adjacent sides of the said feed aperture through which it is reciprocated, and said box having walls extending from said aperture and disposed closely to the path of reciprocation of the feed member, and said feed member being apertured with a plurality of notches at each side thereof adjacent the last mentioned walls, said notches extending from the underside to the upper side of the feed member to relieve pressure of material along and beneath the member.

17. Apparatus for feeding dry divided material and comprising, in combination, a feed hopper having a pair of spaced substantially vertical oppositely disposed rigid walls with a pair of interposed downwardly and inwardly sloping rigid walls, each of the side edges of said rigid sloping walls being close to an adjacent vertical wall, means flexibly connecting each side edge of said sloping walls with an adjacent vertical wall, and means for alternately displacing said sloping walls toward the inside of the hopper to effect movement of material toward a discharge opening at the bottom of the hopper by causing a breaking up of the material in the hopper along progressively intersecting diagonal shear planes without compacting such material, each of said sloping walls being so rigid and the first mentioned means providing such flexibility that the sloping walls have substantially the same stroke when displaced by the second mentioned means.

GEORGE MARTIN BOOTH.
JOHN SCOTT BALLARD.